March 30, 1937.  E. C. HORTON  2,075,615
WINDSHIELD CLEANER
Filed June 15, 1933
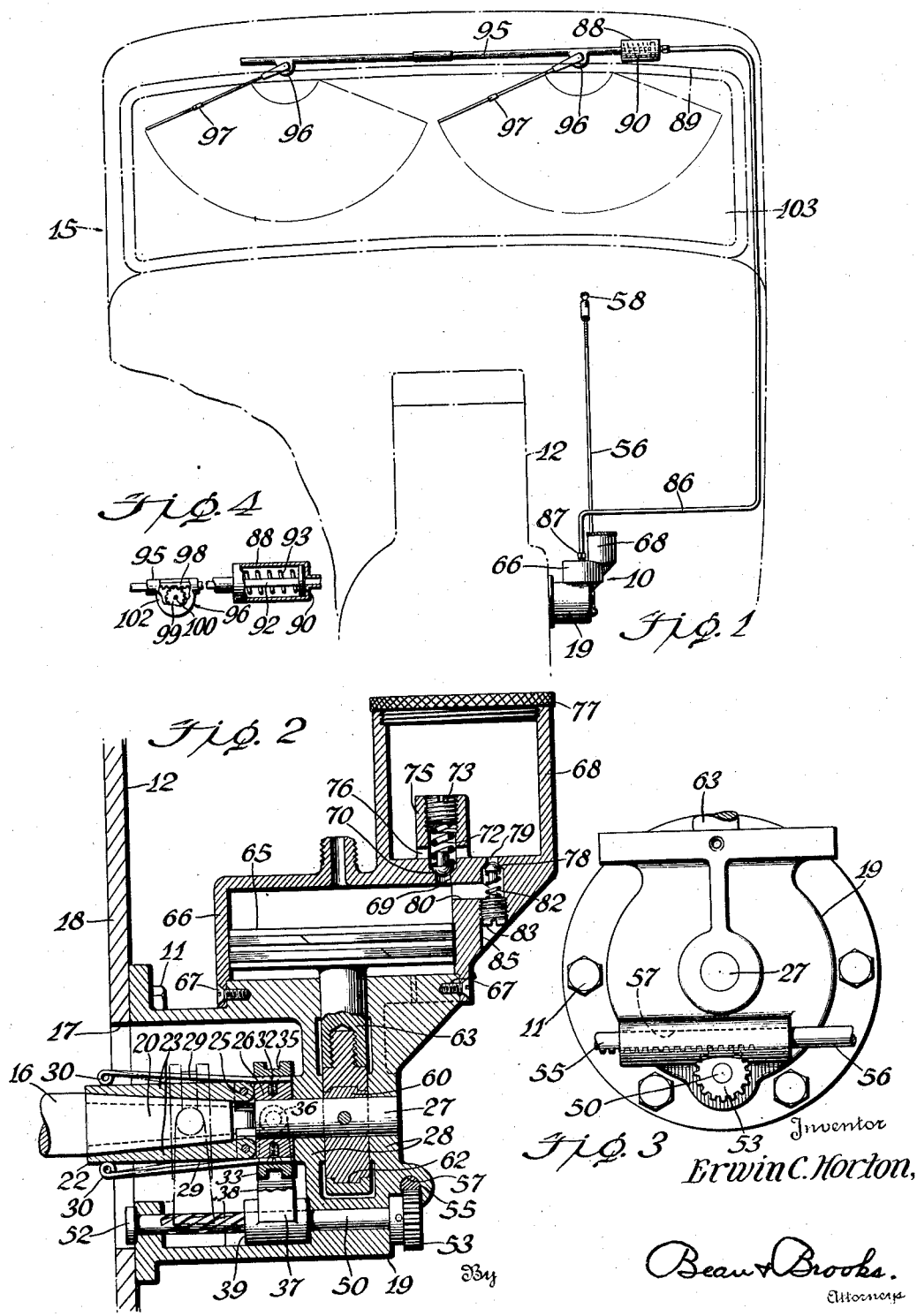
Inventor
Erwin C. Horton,
By Bean & Brooks.
Attorney Patented Mar. 30, 1937

2,075,615

UNITED STATES PATENT OFFICE 2,075,615

WINDSHIELD CLEANER

Erwin C. Horton, Hamburg, N. Y., assignor to Trico Products Corporation, Buffalo, N. Y.

Application June 15, 1933, Serial No. 676,007

8 Claims. (Cl. 15—255)

This invention relates to windshield cleaners and it has particular relation to an operating structure for transmitting power from a variable speed element of a motor vehicle engine to the windshield cleaner, the same being an improvement on Patent No. 2,042,897, granted June 2, 1936, to myself jointly with Henry Hueber.

The primary object of the invention is to provide a practical windshield cleaner construction driven from a moving part of the motor vehicle and embodying speed governing means by which the speed of wiper operation may be selectively maintained substantially at one of a plurality of predetermined speeds.

Another object of the invention is to provide a windshield cleaning device operable by a reciprocable column of incompressible liquid or fluid having its power supplied from a vehicle power plant and having speed compensating mechanism to provide a substantially constant speed of the windshield cleaner.

Another object of the invention is to provide a speed compensating means for transmitting power from a variable speed element on a motor vehicle for transmitting substantially uniform reciprocable motion to a connected window wiper.

In the drawing:

Fig. 1 is a front elevation of the windshield cleaning device and illustrating the manner in which the device is mounted upon a vehicle shown in outline.

Fig. 2 is a cross section, on a larger scale, illustrating a speed compensating and other operating elements of the device.

Fig. 3 is a fragmentary side elevation of the lower portion of the construction shown in Fig. 2; and Fig. 4 is a fragmentary view partially in cross section and illustrating the operating elements of a wiper actuating construction.

In practicing the invention a windshield cleaner operating device 10 is bolted, as indicated at 11, to the side of an internal combustion engine 12 which is mounted in a conventional manner in a motor vehicle 15.

A rotatable driving member or shaft 16 for the cleaner operating device receives its power from the engine and extends through an opening 17 in a casing wall 18 of the engine into a casing 19 of the device. A conical outwardly tapered portion 20 of the driving member is inserted into a speed compensating slipping clutch 22 which includes a series of sections 23 circumferentially arranged or embracing the conical portion 20 and having pivotal connections 25 to a collar 26 rigidly secured to one end of a stud shaft 27. The other end and intermediate portions of the stud shaft are freely rotatable in bearing portions 28 of the casing 19.

Spring arms 29 having end bearing knuckles 30 thereon, and secured as indicated at 32, to the outer surface of the collar 26, extend along the clutch sections 23 in such manner that the knuckles resiliently impinge upon the outer end portions of the sections opposite the pivotal connections 25. A ring 33 having an annular groove 35 therein is slidably mounted circumferentially about the collar 26 and about the secured ends of the springs. This groove receives trunnion construction 36 of an adjusting block 37 which includes a bifurcated portion 38 and an internally threaded sleeve 39. A rotatable adjusting rod 50 is threaded into the sleeve and is rotatably mounted adjacent its ends in the walls of the casing. One end of the rod 50 has a head 52 thereon for maintaining it in these walls and the other end rigidly carries a pinion 53 which co-acts with a rack 55 formed at one end of a control rod 56 and slidable in an opening or guideway 57 of the casing. The control rod has a suitable knob 58 on its end and extends to a position conveniently accessible to the vehicle operator to facilitate its manual actuation.

By axially moving the control rod in the proper direction the ring 35 is moved toward its broken line position shown in Fig. 2 and the springs 29 cause the clutch section to grip the conical end of the driving member 16 under the increased pressure thus applied through the springs. It will be noted that the springs diverge outwardly from their connection to the ring 35. In the full line position shown in Fig. 2 the driving member 16 slips in the clutch members without rotating the stud shaft 27. An eccentric 60 rigidly secured upon the stud shaft between the wall portions 28 rotatably carries in a casing opening 62 the end of a piston rod 63 upon which a piston 65 is rigidly secured and is reciprocable in a cylinder 66 that is secured, as indicated at 67, to the casing 19. A safety reservoir 68 integral with the cylinder 66 communicates therewith through a port 69 having a valve 70 therein that is constantly urged toward the interior of the cylinder by means of a coil spring 72 surrounding a portion thereof. The end of the spring opposite the valve rests upon a plug 73 that is screw threaded into the outer end of a nipple 75 that is integral with the reservoir and has lateral openings 76 to provide communication between the reservoir and the cylinder when the valve is open. The plug is adjustable to vary the resistance of the spring to the opening of the valve. A suitable cap 77 removably threaded upon the reservoir provides for sealing the latter and providing access to the valve mechanism just described. A second valve 78 also provides communication between the cylinder and reservoir between ports 79 and 80, and a spring 82 engaging the valve normally urges it in a direction opposite that in which the valve 70 is normally urged. A plug 83 adjustably screw threaded in an opening 85 leading to the reservoir and opposite the port 79 engages the end of the spring opposite the valve 78.

A conduit 86 has a suitable fluid transfer connection 87 to the interior of the cylinder and extends to a second cylinder 88 mounted in the upper portion of a header member 89 of the vehicle. A piston 90 having a piston rod 92 thereon extending in a direction opposite the connection of the conduit 89, is slidable in fluid tight relation in the cylinder 88 and is normally maintained in the end of the cylinder, as shown in Fig. 4, by means of a compression spring 93 that surrounds the piston rod and impinges upon the opposite end wall of the cylinder. An oblong casing 95 extending axially from the cylinder 88 slidably receives the piston rod and is provided with a plurality of power transmitting devices 96 designed to provide proper oscillatory motion to windshield wipers 97 to which they are connected. Each of these power transmitting devices includes a rack 98 constituting a part of the piston rod which engages a pinion 99 rigidly carried by a pin 100 rotatable in a casing 102. One windshield wiper 97 is rigidly secured to each pin 100 to provide desired oscillation thereof across the windshield 103 as indicated in broken lines of Fig. 1.

A supply of liquid is maintained in the cylinders 66 and conduit 86, and since the compressibility of liquid is practically negligible, the reciprocable movement of the piston 65 is transmitted through the liquid into the cylinder 88 to reciprocate the piston 90 and hence operates the wipers through the action of the rack and pinion 98—99. In the return movement of the piston 65 the spring 93 moves the piston 90 back to the position shown in Fig. 4 until the succeeding forward piston stroke. In the event the conduit 86 becomes clogged or if the wipers fail to respond to the force imparted thereto, the liquid forced outwardly from the cylinder 66 unseats the valve 70 and its force is dissipated in the reservoir 68. Upon return or inward stroke of the piston 65 the liquid is drawn from the reservoir back into the cylinder 66 by the opening of the valve 78 under the influence of the compressed air in the reservoir above the liquid and the tendency toward creating a vacuum in the upper portion of the cylinder 66. It is of course to be understood that the resistance of the spring 72 is sufficient to maintain the valve 70 closed during the normal operation of the pistons 69 and 90.

Because of the variation of pressure applied to the conical portion 20 of the shaft 16 under the influence of the springs 29, variation of the position of the plug 73 serves to regulate the device for operation between desired speed limits. These speed limits may be high or low depending upon whether or not it is desired to oscillate the wiper slowly or rapidly across the windshield. As the shaft 16 operates a given number of revolutions, the clutch section 23 begins to slip. Thus a very satisfactory piston actuating arrangement is provided in which the clutch, piston, and nonyieldable liquid cooperate to move the wipers 97 in the manner desired.

Although only one form of the invention has been shown and described in detail it will be apparent to those skilled in the art that the invention is not so limited but that various changes may be made therein without departing from the spirit of the invention or from the scope of the appended claims.

I claim:

1. A motor vehicle having a window and a variable speed shaft, a reciprocable wiper for the window, transmission means operatively connecting the wiper to the shaft to be driven thereby, speed responsive governor means included in the transmission means and arranged adjacent the variable speed shaft for limiting the maximum speed of operation of the wiper, and manually adjustable control means connected to the governor means and extending from the latter to a position for being operated from the driver's seat to vary the maximum speed responsiveness of said governor means for varying the maximum speed of the wiper operation.

2. In combination with a motor vehicle power plant having a variable speed shaft, a windshield cleaner having a wiper, a driven shaft for actuating the wiper on the windshield surface, transmission means operatively connecting the variable speed shaft to the driven shaft and including speed responsive means operable to maintain the driven shaft speed substantially constant in the presence of a relatively faster speed of the variable speed shaft, said speed responsive means having a centrifugally operated element acting against a spring, and means manually operable from the driver's seat for adjusting the effectiveness of the spring on the centrifugally operated element to vary such substantially constant speed of the driven shaft.

3. In a windshield cleaner, a wiper member, a drive member therefor, transmission means connecting the drive member to the wiper member and embodying a clutch element extending into frictional engagement with the drive member and movable toward and away therefrom under centrifugal force, a resilient arm having its inner end portion fixed to rotate with the clutch element and its outer end yieldably bearing on the clutch element to urge the latter into frictional engagement with the drive member, means bearing on the resilient arm for increasing the yielding pressure thereof on the clutch element, and means for adjusting the last mentioned means toward and from the fixed end portion of the resilient arm to thereby vary the responsiveness of the clutch to centrifugal force.

4. In a windshield cleaner, a wiper operating member, a drive for said wiper operating member, clutch elements movably connected to the wiper operating member and extending into frictional engagement with the drive member, said clutch elements being movable toward and away from said drive member, resilient arms having their inner end portions fixed to said wiper operating member and their outer ends yieldably engaging the clutch elements, means movable along the resilient arms to vary their spring tension and hence the pressure of the clutch elements against the drive member, and means for moving said last mentioned means to various positions along said arms whereby to regulate the speed of the wiper driven by said wiper operating member.

5. In combination with a motor vehicle power plant having a variable speed shaft, a windshield wiper, transmission means operatively connecting the wiper to said variable speed shaft, said transmission means including a friction clutch operatively connected to the wiper and adapted to frictionally engage said variable speed shaft to connect the latter through said transmission means to the wiper, speed responsive means embodied in the friction clutch to permit the variable speed shaft to operate at a relatively faster speed than said wiper, and remote control means for regulating the responsiveness of said speed responsive means thereby to control the wiper operation.

6. In a motor vehicle having a windshield, a wiper movable upon the surface of the windshield, a variable speed rotatable drive shaft carried in the vehicle, a rotatable clutch frictionally engaging the shaft to provide driving connection therewith, means for operatively connecting the clutch to the wiper, said clutch including yieldable means normally urging the clutch into frictional engagement with the shaft, said clutch being responsive to predetermined centrifugal force to release the shaft from clutching action, and selective adjusting means having a mounting in the vehicle accessible to the operator for manual operation thereof and connected to said clutch to vary the effective resistance of the yieldable means to control the responsiveness to centrifugal force of the clutch whereby the speed limit of the wiper is selective.

7. In a motor vehicle having a wiper, a variable speed drive member, a wiper actuating member, clutch elements pivoted to the actuating member and extending into frictional engagement with the drive member, said clutch elements being pivotable toward and away from said drive member, resilient arms having their inner end portions secured in normally converging relation to the actuating member and their outer ends yieldably engaging the clutch elements, a collar slidably embracing said arms and movable thereon to vary the pressure of the clutch elements against the drive member, and means for moving the collar to regulate the maximum speed of wiper operation.

8. In combination with a motor vehicle power plant having a variable speed shaft, a windshield cleaner having a wiper, a driven shaft for actuating the wiper on the windshield surface, transmission means operatively connecting the variable speed shaft to the driven shaft and including a friction clutch operative to maintain the driven shaft speed substantially constant in the presence of a relatively faster speed of the variable speed shaft, said friction clutch being responsive to a predetermined centrifugal force for disconnecting the driven shaft from the variable speed shaft and having means for adjusting the responsiveness of the friction clutch whereby the predetermined speed of wiper operation may be selected, and means manually operable for adjusting said responsive means of the friction clutch.

ERWIN C. HORTON.